Ⅰ US008041631B1

(12) United States Patent
Lloyd et al.

(10) Patent No.: US 8,041,631 B1
(45) Date of Patent: *Oct. 18, 2011

(54) SECURE BIDDING SYSTEM AND METHOD

(75) Inventors: Dennis W. Lloyd, Lake Quivira, KS (US); Jeff T. White, Shawnee, KS (US); Charles M. Pacunski, Leawood, KS (US)

(73) Assignee: Columbia Capital Management, L.L.C., Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 13/108,936

(22) Filed: May 16, 2011

Related U.S. Application Data

(62) Division of application No. 12/051,725, filed on Mar. 19, 2008, now Pat. No. 7,945,504.

(60) Provisional application No. 60/895,739, filed on Mar. 19, 2007.

(51) Int. Cl.
*C06Q 40/00* (2006.01)
(52) U.S. Cl. .......................................... 705/37
(58) Field of Classification Search ................. 705/37
See application file for complete search history.

(56) References Cited

U.S. PATENT DOCUMENTS

| 6,122,738 | A  | * | 9/2000  | Millard ...................... 713/187 |
| 6,606,607 | B1 | * | 8/2003  | Martin et al. .................. 705/37 |
| 6,834,312 | B2 | * | 12/2004 | Edwards et al. ............. 709/246 |

\* cited by examiner

*Primary Examiner* — Charles Kyle
*Assistant Examiner* — Clifford Madamba
(74) *Attorney, Agent, or Firm* — Charles A. Lemaire; Lemaire Patent Law Firm, P.L.L.C.

(57) ABSTRACT

Secure image bidding system process for financial transactions, including structured investment products, escrows and interest rate swaps. Some embodiments provide a secure image bidding system and process for image-based bid transmissions where each of a plurality of bids received by the system is encrypted and held in a digital "Vault" until the specified end of the bid period, at which time a package containing the encrypted bids, a log of server activity, and a digital checksum of the original bid file is sent via electronic mail to the bid broker and other participants. A second electronic mail message is sent to the bid broker and other participants containing the decryption key. During the bid process, no party has access to the bid information and there is no human interaction in the receipt, conversion to image, encryption, storage or conveyance of compiled information.

23 Claims, 12 Drawing Sheets

SECURE BIDDING SYSTEM AND METHOD

CROSS-REFERENCE TO RELATED APPLICATIONS

This application is a divisional of U.S. patent application Ser. No. 12/051,725 filed Mar. 19, 2008, titled "SECURE IMAGE BIDDING SYSTEM" (which issued as U.S. Pat. No. 7,945,504 on May 17, 2011), which claims benefit under 35 U.S.C. §119(e) of U.S. Provisional Patent Application No. 60/895,739 filed Mar. 19, 2007 and titled "SECURE IMAGE BIDDING SYSTEM," each of which is incorporated herein by reference in its entirety.

FIELD OF THE INVENTION

The invention lies in the field of financial systems and processes that are assistive mainly to the municipal finance industry, but to other industries as well. More particularly, it relates to a process that permits a broker for structured investment products, escrow purchases and interest-rate-swap and other competitive quotations to accept image-based bids, including facsimile and electronic mail bids, which are cryptographically secured upon receipt, such that during a defined bid period, no parties have access to the actual bid information until the close of the bid period when a decryption key is generated by the system.

BACKGROUND OF THE INVENTION

Under present Federal tax law, the reinvestment of bond proceeds generated through the sale of municipal bonds by the bond issuer (typically a governmental entity such as a state, city, county or school district) is subject to significant restriction. With some exceptions, an issuer's investment earnings on idle bond proceeds are limited to the arbitrage yield on the bonds (as defined by the Internal Revenue Code). Additional interest earned above the arbitrage yield generally must be rebated to the U.S. Government. By law the placement of investments of bond proceeds must be done in a competitive fashion, ensuring the highest yield possible given the bidding restrictions. Generally, at least three bona fide bids must be offered before one may be accepted under Internal Revenue Service "safe harbor" guidelines.

The typical current practice is for a third-party bid broker to develop and distribute bid specifications and a bid form to potential bidders. At or before an appointed time, bidders may submit bids to the broker by voice, facsimile, or electronic mail. During the bidding process, the broker is aware of the values of the bids submitted.

The practice of brokering these types of investments is not at present regulated. As a result, in recent times the IRS has found or has alleged that participants in the bidding process—both brokers and the bidders (providers of the investment products, typically investment banks and insurance companies)—have rigged and colluded on bids, resulting in lower investment earnings on the investments and, as a result, lower rebate payments to the U.S. Government. The IRS estimates the costs of this bid-rigging and collusion to exceed $100 million to date.

Generally, this illicit rigging and collusion involves brokers and/or providers agreeing to: (1) provide non-competitive bids in order to meet the three-bid minimum; (2) make or participate in side payments of fees or other considerations in order to ensure a particular bid is the winner; (3) provide a "last-look" to a bidder, giving one participant information on the results of the bidding process and leading to an unfair advantage.

Most of these non-competitive processes result from the broker's ability to influence the outcome of the bidding process during the bid itself. By creating a secure process for the receipt of bids, restricting the broker's knowledge of specific bid information during the bid process, creating an electronic log of all bidding activity, and providing all bids received simultaneously and transparently to transaction participants (broker, issuer, bond counsel, tax counsel) at the expiration of the bid process, the broker's ability to influence the outcome is nearly eliminated. A level playing field is created for all bidders and the highest possible investment yield is assured to the benefit of the issuer and the U.S. Government.

This process uses the same technologies currently employed by the bidders—specifically, facsimile, and to some extent, electronic mail—in the existing process, so it does not create an additional burden to bidder participation.

BRIEF SUMMARY OF THE INVENTION

In some embodiments, the invention provides a secure-image bidding system process for structured investment products, escrow purchases, and interest rate swaps. The problem of bid-rigging or broker interference is eliminated through the use of the technologies and processes described below.

In some embodiments, the invention relies upon open-source and commercial software, coupled with custom-developed interfaces, scripting and computer code to provide a computer-based application for the receipt in electronic form of secure, electronic images via facsimile, electronic mail and other mechanisms for structured investment products, escrow purchases and interest rate swaps, among others.

In some embodiments, the process includes the following steps (please note that although very specific details are listed here for completeness, the process and apparatus of the present invention can be practiced in a more general manner by changing or omitting some of these details):

1) Prior to an established bidding period, the broker will deliver to potential bidders specifications and a bid sheet via unsecured email, facsimile, US mail or other means.
2) Using graphical user interface, secured through user name and password login, the broker will establish the bid parameters on the host server computer. Parameters include date and time of the bid, length of the bidding process, the phone number assigned to the bid process for facsimile transmissions, the number of phone lines available to the bid, the electronic mail address assigned to the bid process, and a distribution list of transaction participants (which do not include bidders) who will be allowed to review the bids and related information at the end of the bidding period.
3) Approximately ten minutes prior to the opening of a bid period, using a secure graphical-user interface (a GUI, wherein, e.g., in some embodiments, HTML is used to implement the GUI) with the bid server, the broker may commence a test of the system which will generate a test facsimile and a test email to be processed through the steps below to ensure appropriate function of the process. Following the commencement of this test, the broker will be locked out of the system for the remainder of the bid process.
4) Shortly before the opening of bid period, the broker and bid administrator will be locked out of the server automatically.

5) Shortly before the opening of the bid period, the server will automatically start the facsimile reception and electronic mail reception software.
6) Immediately prior to the opening of the bid period, a companion key server will automatically generate a private encryption key for the bid period using 64-bit or higher public key infrastructure (PKI) technology.
7) During the bid period, bidders may send their bid on the official bid form via facsimile (to a facsimile server), electronic mail or other means to the server according to the bid specifications.
   a. Facsimile bids received will be converted automatically to a compressed-image-format file (such as Tagged Image File (TIF) format, in some embodiments)
   b. Email bids received will have their attachments stripped and converted to a compressed-image-format file with the remaining email securely stored (to ensure that any information included in the message body of the email is not seen by the broker).
   c. The receipt of each bid by facsimile, electronic mail or other means, along with #8 through #11 below, are performed by the generation of a separate computing process for each bid. There is no queuing of bids waiting to be processed, further enhancing the security of the system.
8) Bidders will receive a confirmation of receipt of their bid via electronic mail transmission. Email bids will be confirmed to the sender's email address. Facsimile bids will be confirmed to the email address as provided to the broker by the bidder prior to the commencement of the bid process associated with the caller identification information transmitted with the facsimile bid.
9) A digital checksum will be calculated for each compressed-image-format file to provide assurance that the original file has not been altered by any party following receipt into the system.
10) Each compressed-image-format file (e.g., in some embodiments, a TIF file) will be encrypted using PKI technology. The unencrypted compressed-image-format files will be immediately destroyed following encryption by the server.
11) Each encrypted compressed-image-format file will be delivered to an electronic "Vault"—a directory on the server that holds all encrypted bids until termination of the bid process. The Vault will also include checksum information and server logs, as described below.
12) At the end of the bid process, the server will automatically stop receipt of any new facsimile or electronic mail transmissions. Transmissions in progress at the expiration of the bid period will be allowed to complete.
13) Shortly after the end of the bid process, the server will compile all information in the vault into a compressed file and will transmit that compressed file to the transaction participants (non-bidders) on the broker's distribution list via electronic mail.
14) Shortly after #13, the server will generate a public key to de-encrypt the information in the compressed file, and such key will be sent via email to the distribution list. Without this key, none of the bid information in the compressed file will be able to be read or reviewed.
15) Following the broker's decision to award the bid, the broker may use a web-based form to provide a bid summary report which may be delivered by email or facsimile to both bidders and the distribution list.
16) All steps in this process will be logged and archived, ensuring an audit trail and complete record of bid activity throughout the process.
17) Following the closure of bid process, all information in the vault, all bid process server logs and the broker's bid summary report will be archived to the server or offsite storage permanently for compliance purposes.
18) The broker or administrator can use a web-based administrative interface to write archives to CD-ROMs or other media for permanent storage.

While some illustrative embodiments of the invention have been described above, it is, of course, understood that various modifications will be apparent to those of ordinary skill in the art. Such modifications are within the spirit and scope of the invention, which is limited and defined only by the appended claims.

DETAILED DESCRIPTION OF THE INVENTION

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Figure 1:
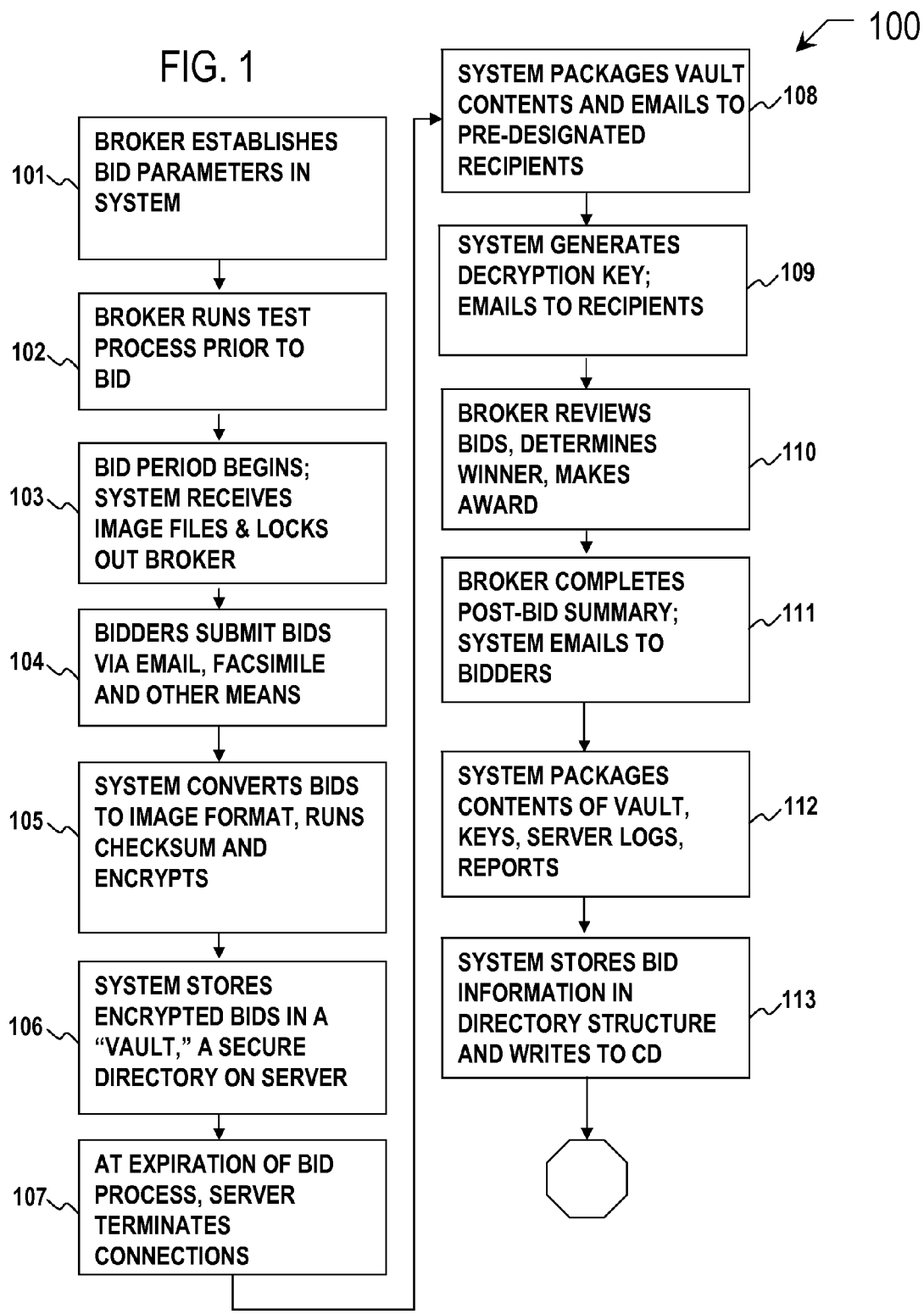
FIG. 1 is a block-diagram overview of a process 100, identifying the key features of the invention.

FIG. 1 is a block-diagram overview of a process 100, identifying the key features of the invention. Process 100 includes a summary of some embodiments of the invention, whereby bids, established by a broker (Processes 101, 102) are received as and/or converted to electronic image files (Processes 103, 104, 105), encrypted and then held securely until the expiration of the bid period (Processes 106,107). Some embodiments provide a secure image bidding system and/or process for image-based bid transmissions where each of a plurality of bids received by the system is encrypted and held in a digital "vault" until the specified end of the bid period, at which time a package containing the encrypted bids, a log of server activity, and a digital checksum of the original bid file is sent via electronic mail to the bid broker and other participants (Processes 108, 110, 111, 112). A second electronic mail message is sent to the bid broker and other participants containing the decryption key (Process 109). The vault is then archived permanently on the server and on removable media (Process 113). During the bid process, no party has access to the bid information and there is no human interaction in the receipt, conversion to image, encryption, storage or conveyance of compiled information.

Figure 2:
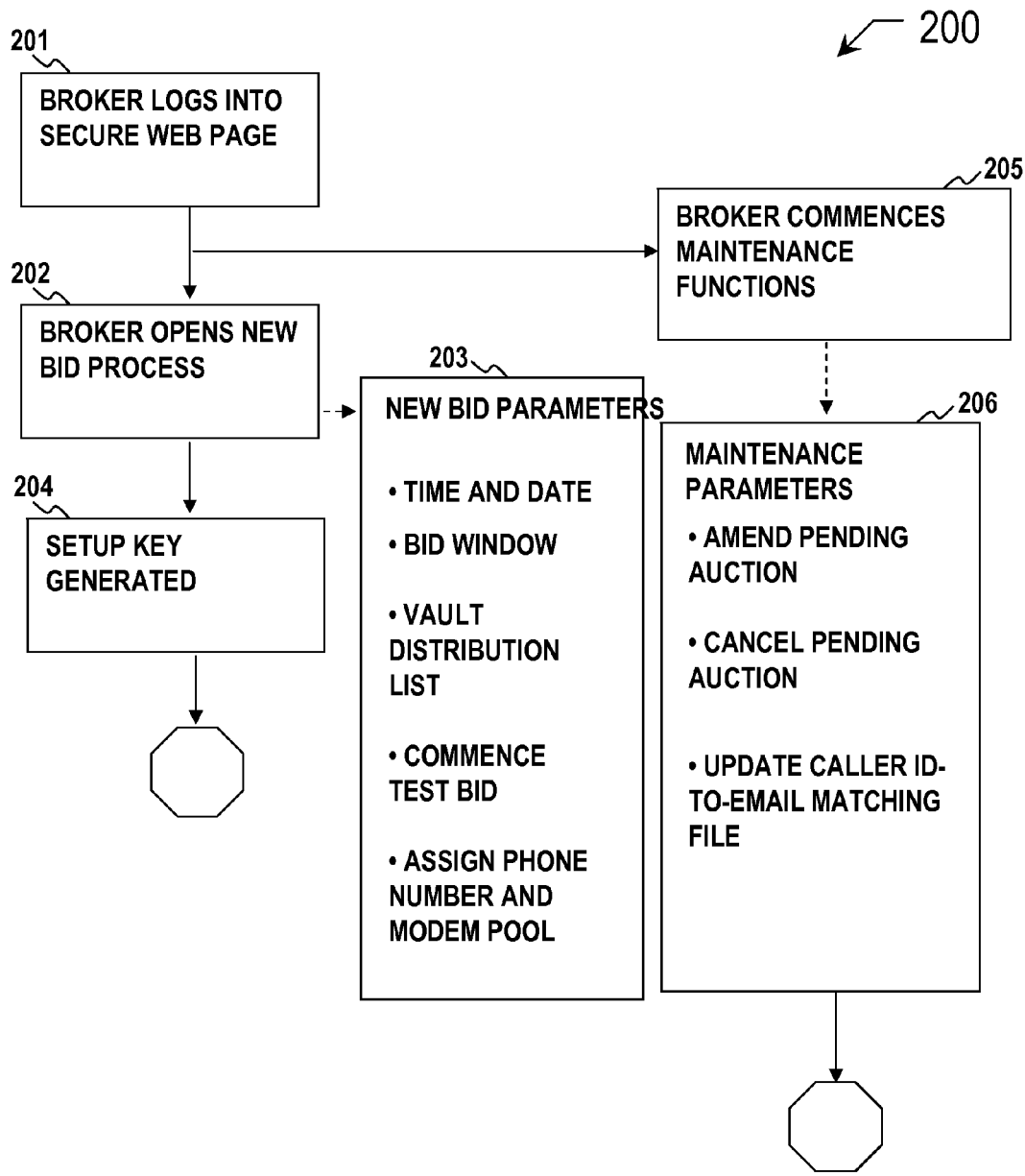
FIG. 2 is a block-diagram overview of a bid-setup process 200, identifying the steps a broker will take to ready the system to receive bids at a future time.

FIG. 2 is a block-diagram overview of a bid-setup process 200, identifying the steps a broker will take to ready the system to receive bids at a future time. Process 200 includes a graphical user interface (Process 201) allowing a broker to establish a bidding period (Process 202), to identify a distribution list of individuals who will receive the bid images and decryption keys upon completion of the process, to identify a number or pool of numbers to which bidders may send their bids via facsimile, to generate an electronic mail address unique to the bidding process to which bidders may send their bids via electronic mail (all in Process 203), to maintain a database of bidder facsimile numbers and associated electronic mail addresses to allow the system to generate confirmation of receipt of the facsimile bid, and to update or modify bid parameters, including the time and date of the bid (all in Processes 205, 206). At the conclusion of this step, the system automatically generates a pair of cryptographic keys (Process 204), unique to the bid process, to be used subsequently to encrypt and eventually decrypt bid-related files.

Figure 3:
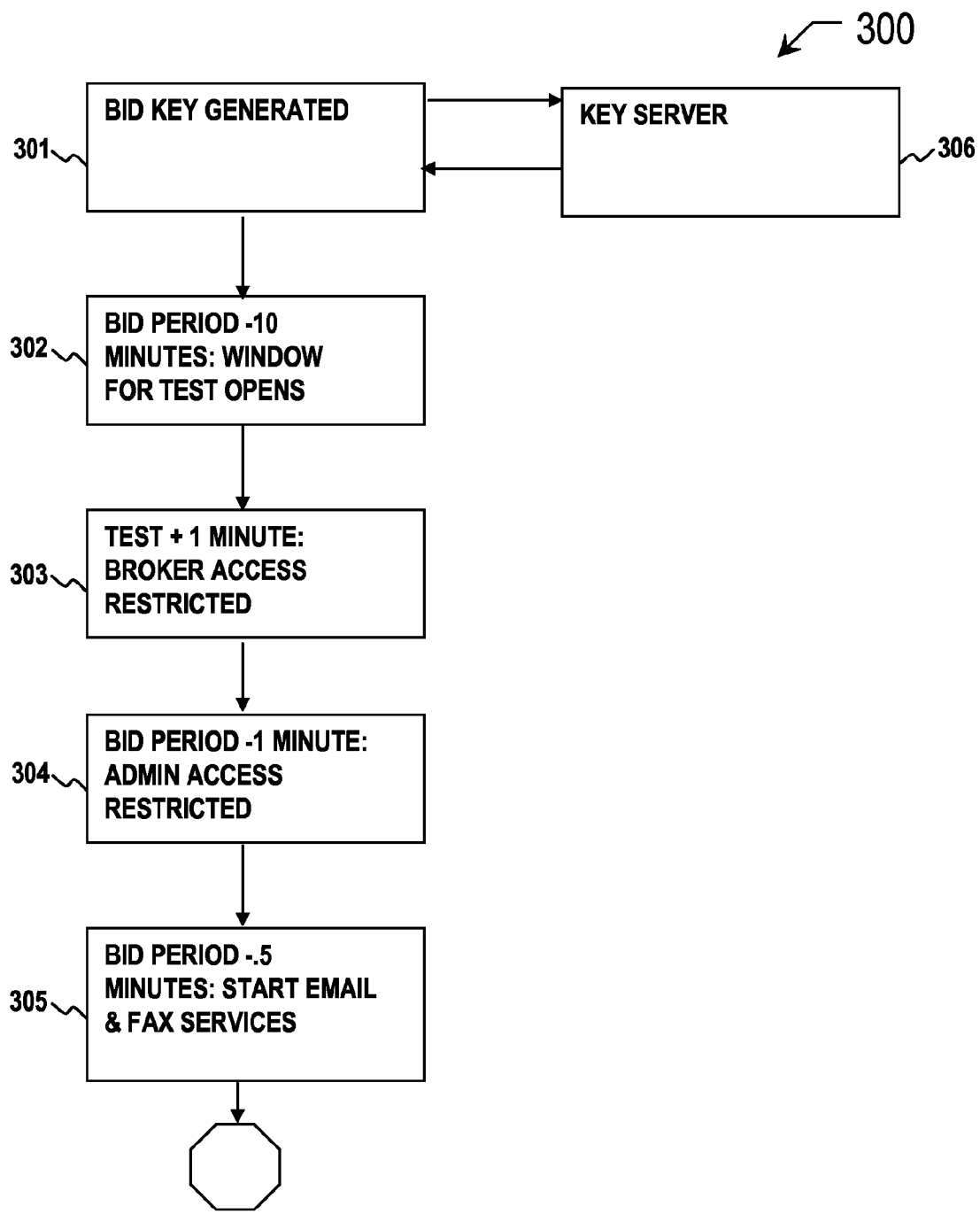
FIG. 3 is a block-diagram of a process 300 having the automatic steps performed by the server in the moments prior to the opening of a bid process.

FIG. 3 is a block-diagram of a process 300 having the automatic steps performed by the server in the moments prior to the opening of a bid process. Process 300 includes the generation of a second pair of cryptographic keys to be stored on a key server (Process 306) used in the encryption and eventual decryption of image files (Process 301). The process documents the opening of a test phase (Process 302), which is more fully described in FIG. 5, and illustrates the automatic removal of broker (Process 303) and administrator access (Process 304) to the system as the bid period nears. The process concludes with the commencement of services on the server integral to the reception of bid transmittals, include facsimile and electronic mail services (Process 305).

Figure 4:
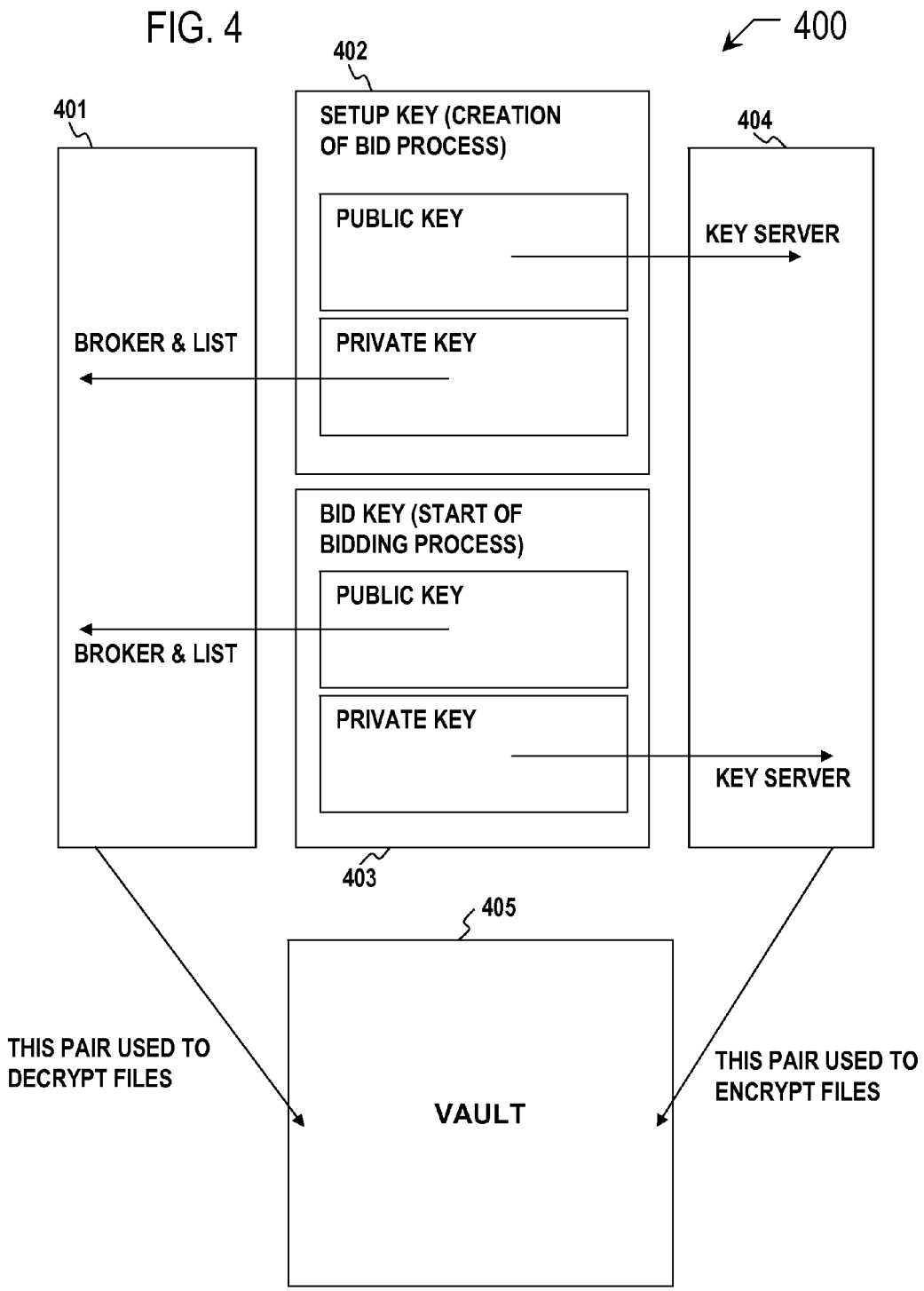
FIG. 4 is a block-diagram of a process 400 that illustrates the mechanics of the system's use of Public Key Infrastructure to encrypt and decrypt bids and related items.

FIG. 4 is a block-diagram of a process 400 that illustrates the mechanics of the system's use of Public Key Infrastructure to encrypt and decrypt bids and related items. Process 400 includes the generation of two pairs of keys: one pair created at the conclusion of the bid set-up process illustrated in FIG. 3 (Process 402); the second pair created shortly before the bid period opens (Process 403). The figure illustrates how each pair of keys is used to both encrypt and decrypt files (Processes 401 and 404). Part of the security of the system is that both pairs of keys are required for the encryption/decryption process to function properly. Without both sets of keys, secure images cannot be decrypted (Process 405).

Figure 5:
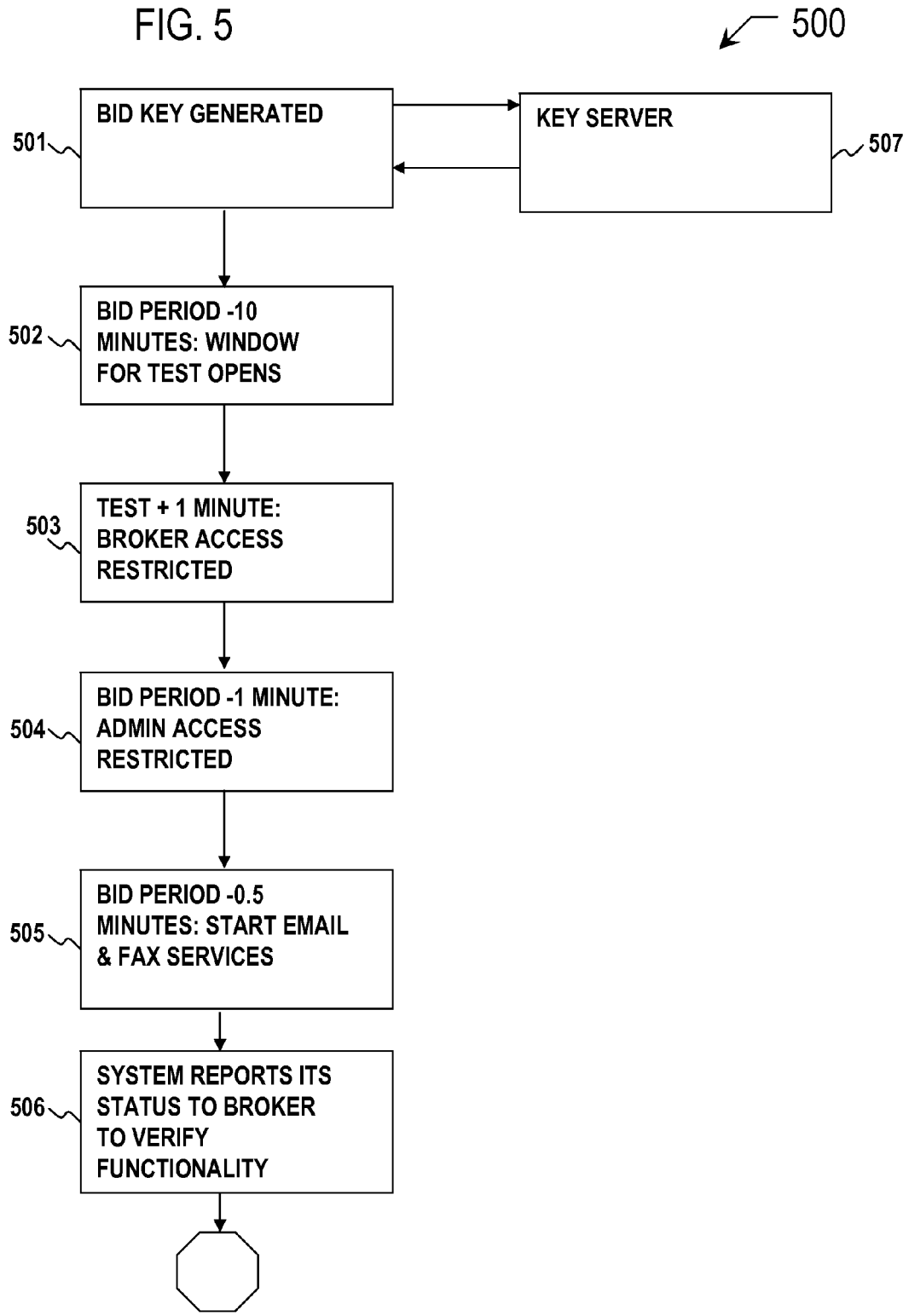
FIG. 5 is a block-diagram of a process 500 that identifies the steps that the system undergoes during the test phase prior to the commencement of a bid process. The test phase provides the broker with positive feedback that the system is working properly ahead of the actual bid.

FIG. 5 is a block-diagram of a process 500 that identifies the steps that the system undergoes during the test phase prior to the commencement of a bid process. The test phase provides the broker with positive feedback that the system is working properly ahead of the actual bid. Process 500 includes the same steps as the bid set-up phase shown in FIG. 3. The test process (Processes 501, 502, 503, 504) delivers both a test facsimile and a test electronic mail through the system and reports to the broker that all services are functioning appropriately (Processes 506 and 507). The process concludes with the system automatically readying itself to receive bid transmissions (Process 505).

Figure 6:
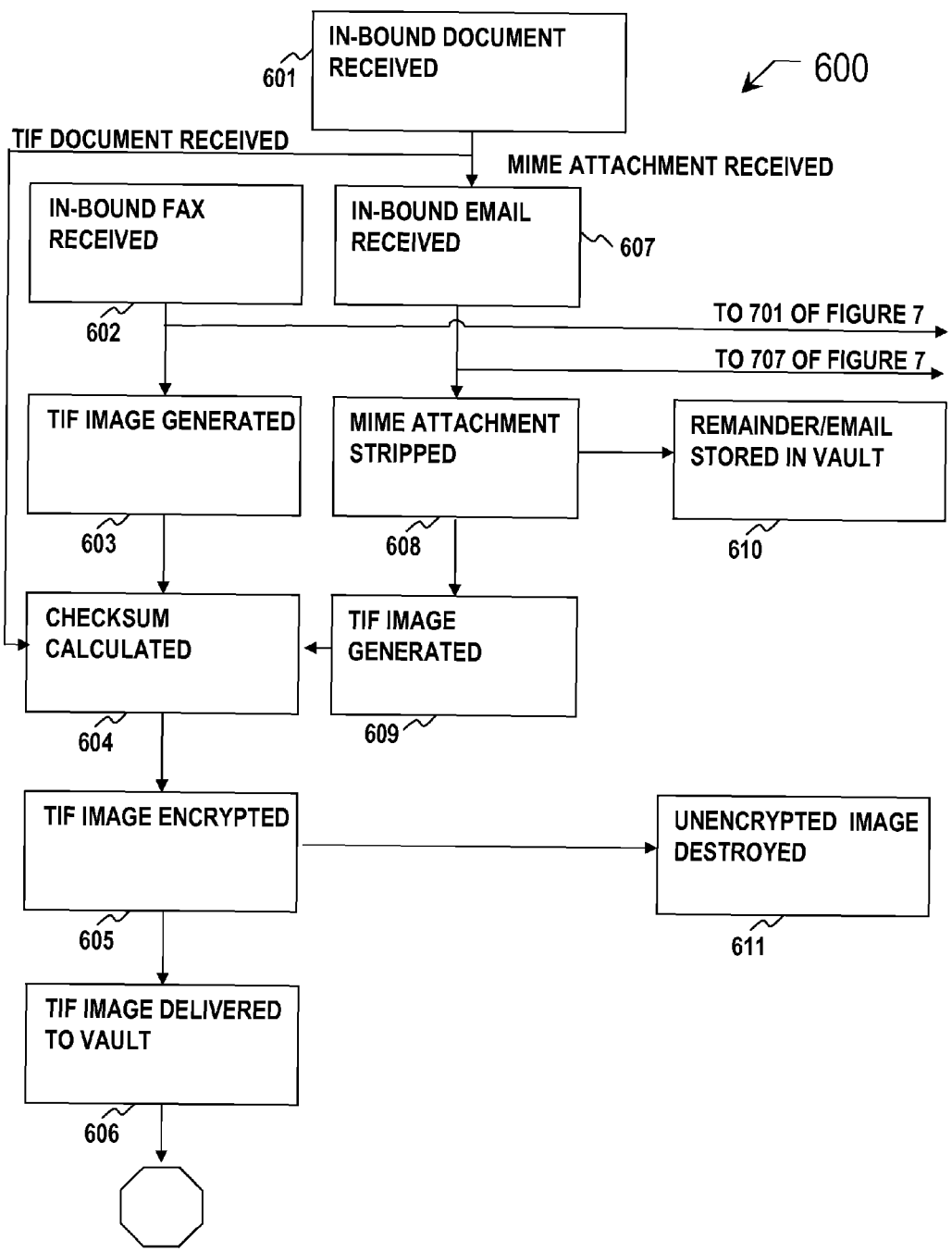
FIG. 6 is a block-diagram of a process 600 that elaborates on the bid receipt process, showing how images of the bids are received or created, encrypted, and sent to the Vault

FIG. 6 is a block-diagram of a process 600 that elaborates on the bid receipt process, showing how images of the bids are received or created, encrypted, and sent to the Vault. Process 600 begins with the receipt of a bid, via facsimile, electronic mail or other electronic means, each spawning a separate computing process to avoid queuing (Process 601). For a facsimile transmission, the bid is received (Process 602), a checksum is calculated to ensure file integrity (Process 604), the facsimile is converted to a Tagged Image File (TIF) format (or other compressed-image-format file, such as .pdf, .jpeg, .gif, or other suitable format) (Process 603), and the TIF is encrypted (Process 605). The original, unencrypted TIF image is instantaneously destroyed (Process 611). The encrypted TIF is then delivered to the vault (Process 606).

For electronic mail messages (Process 607), attachments, including the bid image, are stripped (Process 608) and converted to TIF images (or other compressed-image-format files) (Process 609). The TIF images are encrypted (Process 605), a checksum is calculated (Process 604), and the encrypted image is delivered to the vault (Process 606). The original email is also encrypted and sent to the Vault (Process 610).

Figure 7:
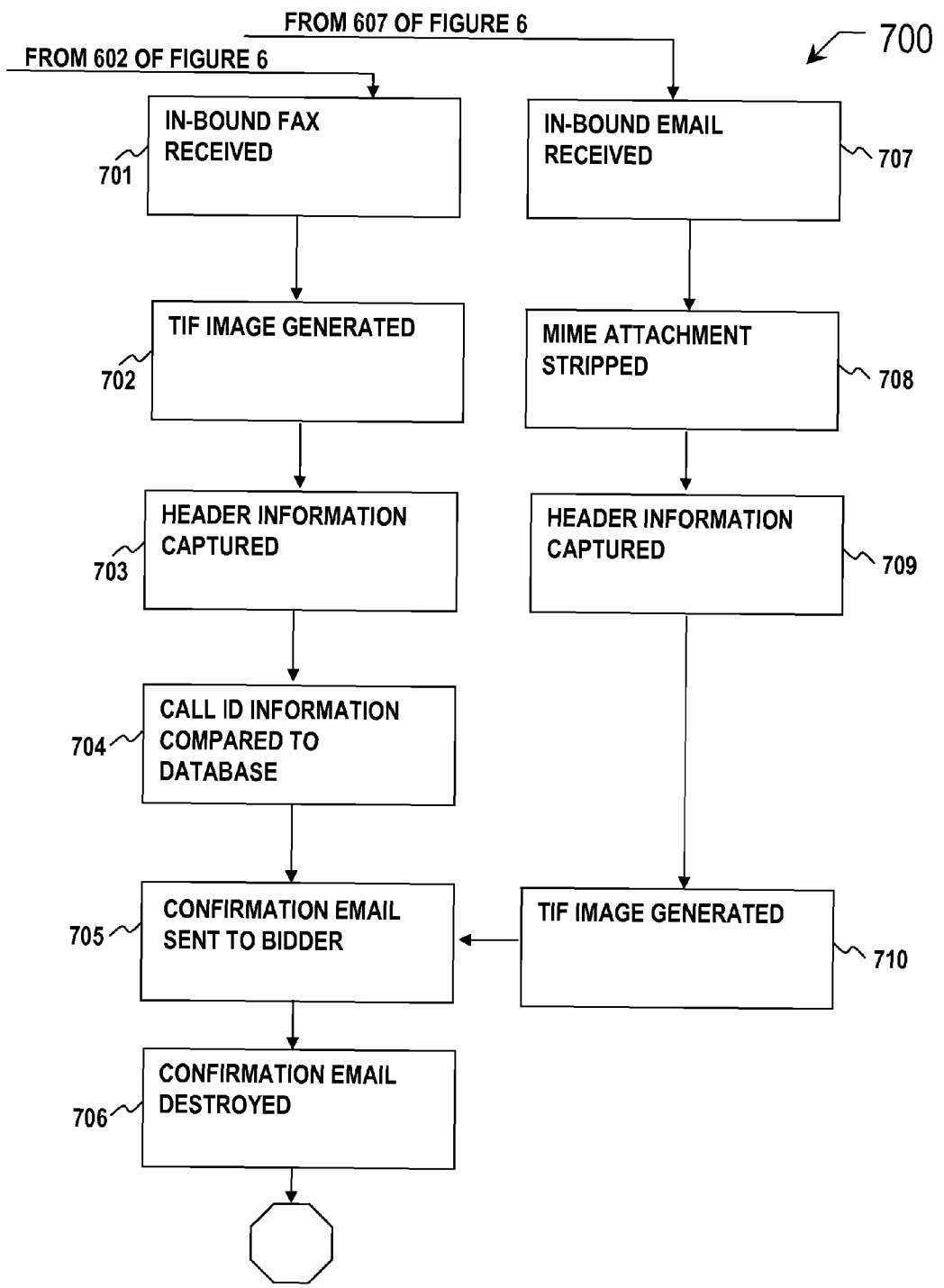
FIG. 7 is a block-diagram of a process 700 that identifies how bidders will be advised that their bids were received by the system.

FIG. 7 is a block-diagram of a process 700 that identifies how bidders will be advised that their bids were received by the system. Process 700 includes the automatic routing of confirmations of bids via the in-bound electronic mail address (Process 707, 708, 709, 710) or using a database lookup for facsimile transmissions (Processes 701, 702, 703), whereby the inbound call identifier is associated with an electronic mail address (Process 704). The system automatically generates confirmations to assure the bidders that their bids were received (Processes 704, 705). The confirmation emails are destroyed instantaneously upon their transmission to the bidders (Process 706).

Figure 8:
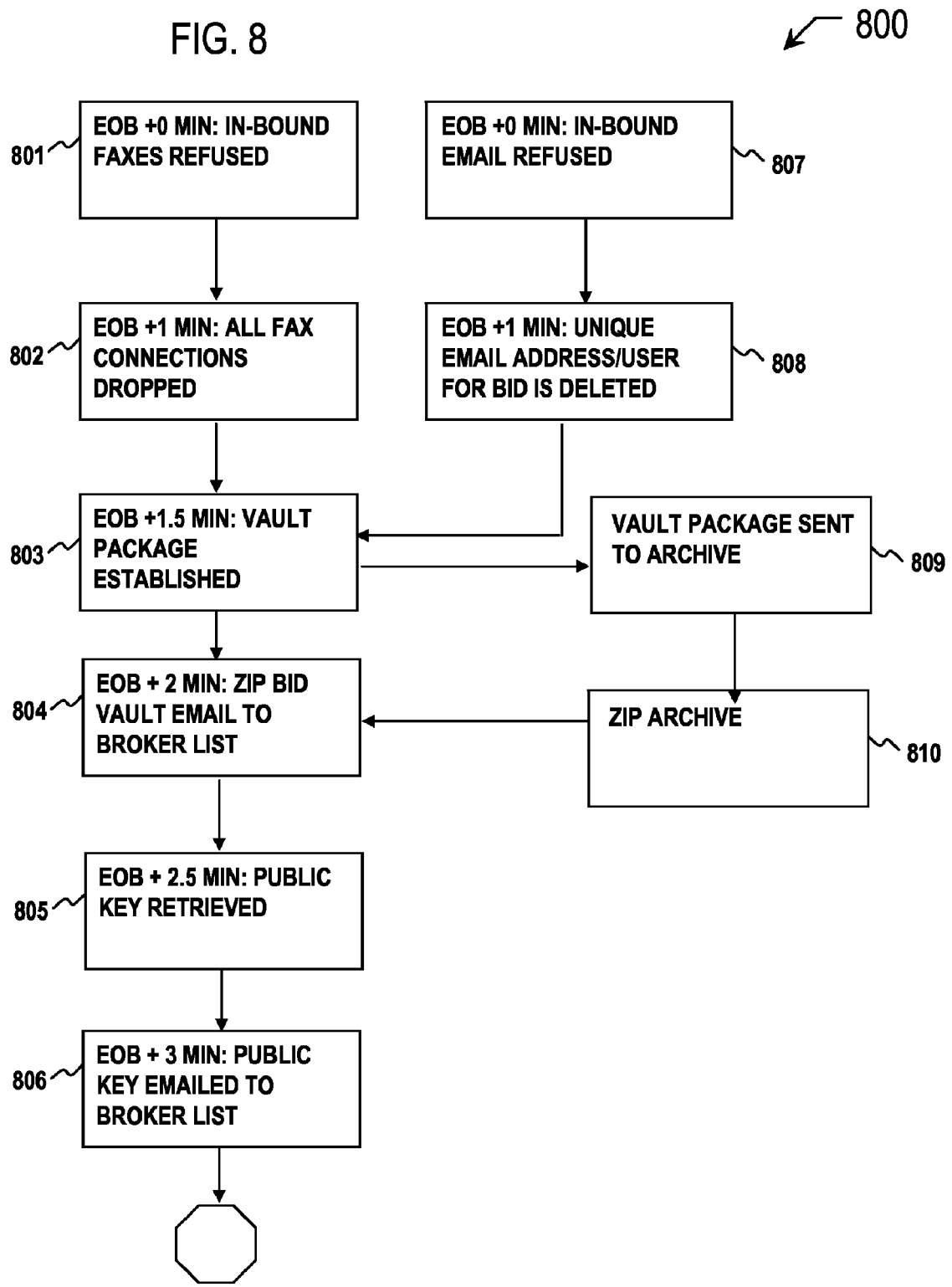
FIG. 8 is a block-diagram of a process 800 that defines the steps automatically taken by the system at the end of the bidding (EOB) process, including the generation of a key for decryption of the items stored in the Vault.

FIG. 8 is a block-diagram of a process 800 that defines the steps automatically taken by the system at the end of the bidding (EOB) process, including the generation of a key for decryption of the items stored in the Vault. Process 800 includes the automatic shutdown of computer services necessary to receive inbound transmissions of bids. At the conclusion of the bidding period, inbound emails will be refused (Processes 807, 808) and inbound facsimile transmissions not in progress at the time of bid expiration will also be refused (Processes 801, 802). Facsimile transmissions in progress at the time of bid expiration will be allowed to conclude. Once the all transmissions have stopped and been processed as described in FIG. 6, the system will automatically bundle all documents in the Vault into a compressed, encrypted file (Process 803) and transmit the compressed file to the broker and the broker's pre-defined distribution list (not including the bidders) (Processes 809, 810, 804). Shortly after the Vault is transmitted to the list, the system sends the same list a decryption key to be used to open the image files containing the bids (Processes 805, 806). The decryption key and the compressed file are also stored in a permanent archive on the server.

Figure 9:
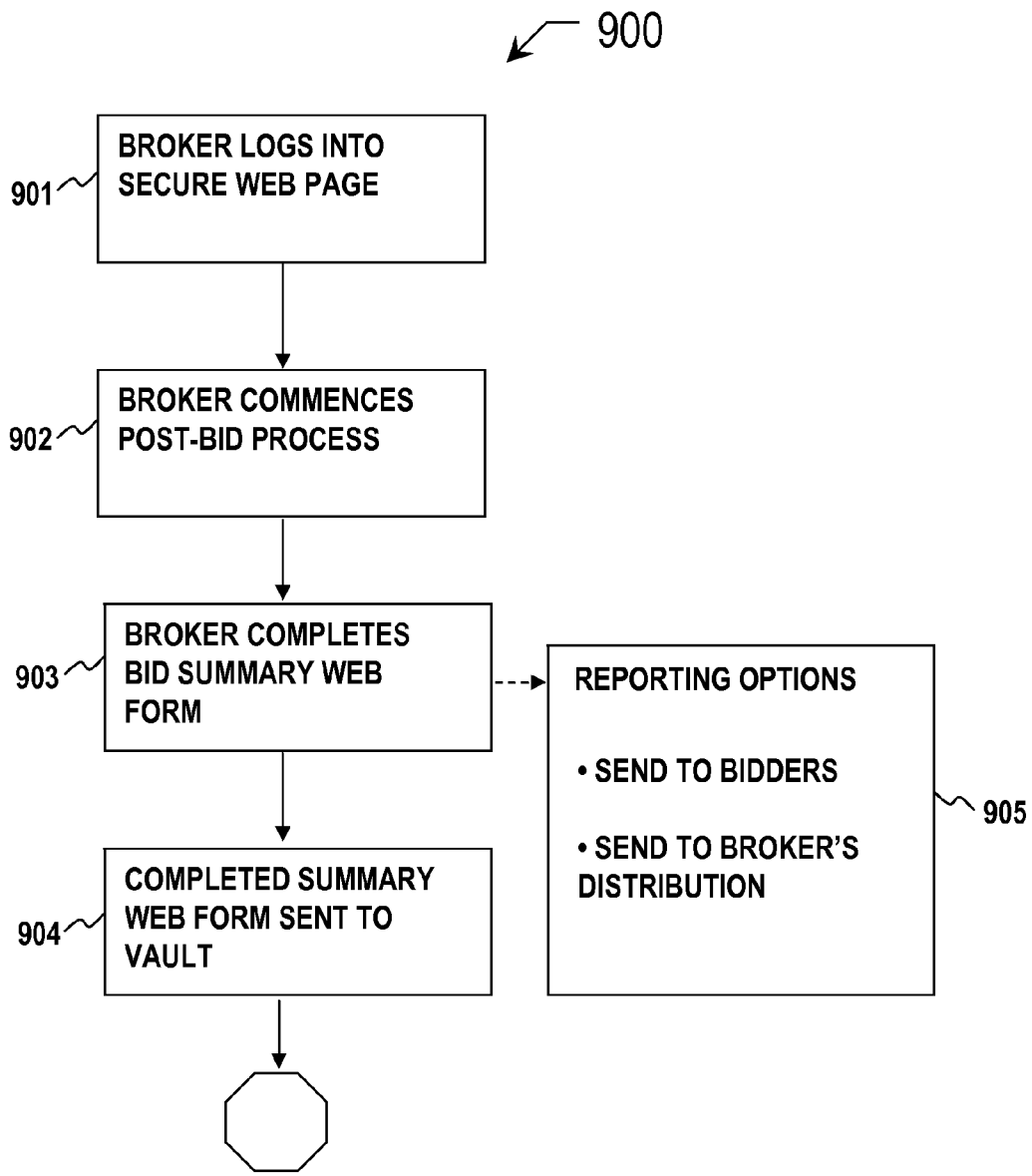
FIG. 9 is a block-diagram of a process 900 that describes the process whereby the broker may summarize the results of the bidding and distribute those results to the bidders and other interested transaction participants.

FIG. 9 is a block-diagram of a process 900 that describes the process whereby the broker may summarize the results of the bidding and distribute those results to the bidders and other interested transaction participants. Process 900 includes a graphical user interface (Process 901) where the broker can enter the bid results in tabular form (Processes 902, 903) and then have the system automatically send a formatted report of those results to a list of the broker's choice (Process 905). In this way, the bidders know the outcome of the bid. The results are stored permanently on the server (Process 904).

Figure 10:
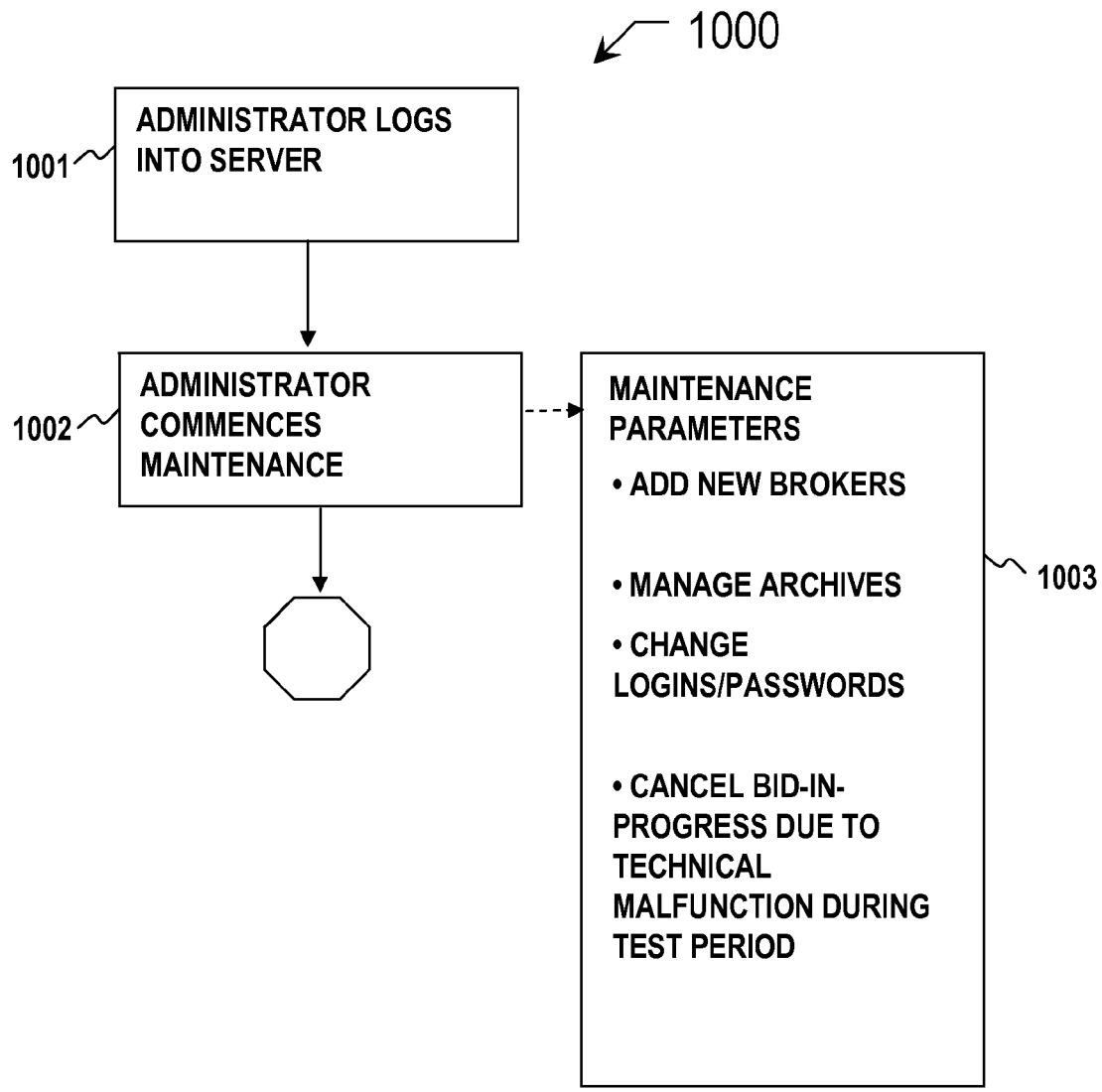
FIG. 10 is a block-diagram of a process 1000 that shows the administrative processes that can be taken to add or remove brokers, change passwords, and manage archived information.

FIG. 10 is a block-diagram of a process 1000 that shows the administrative processes that can be taken to add or remove brokers, change passwords, and manage archived information. Process 1000 includes a graphical user interface (Process 1002) allowing a bidding administrator to add brokers authorized (Process 1001) to use the bidding system, to managing archives of prior bids, to change login and password information, and to cancel a bid process due to technical difficulties (Process 1003).

Figure 11:
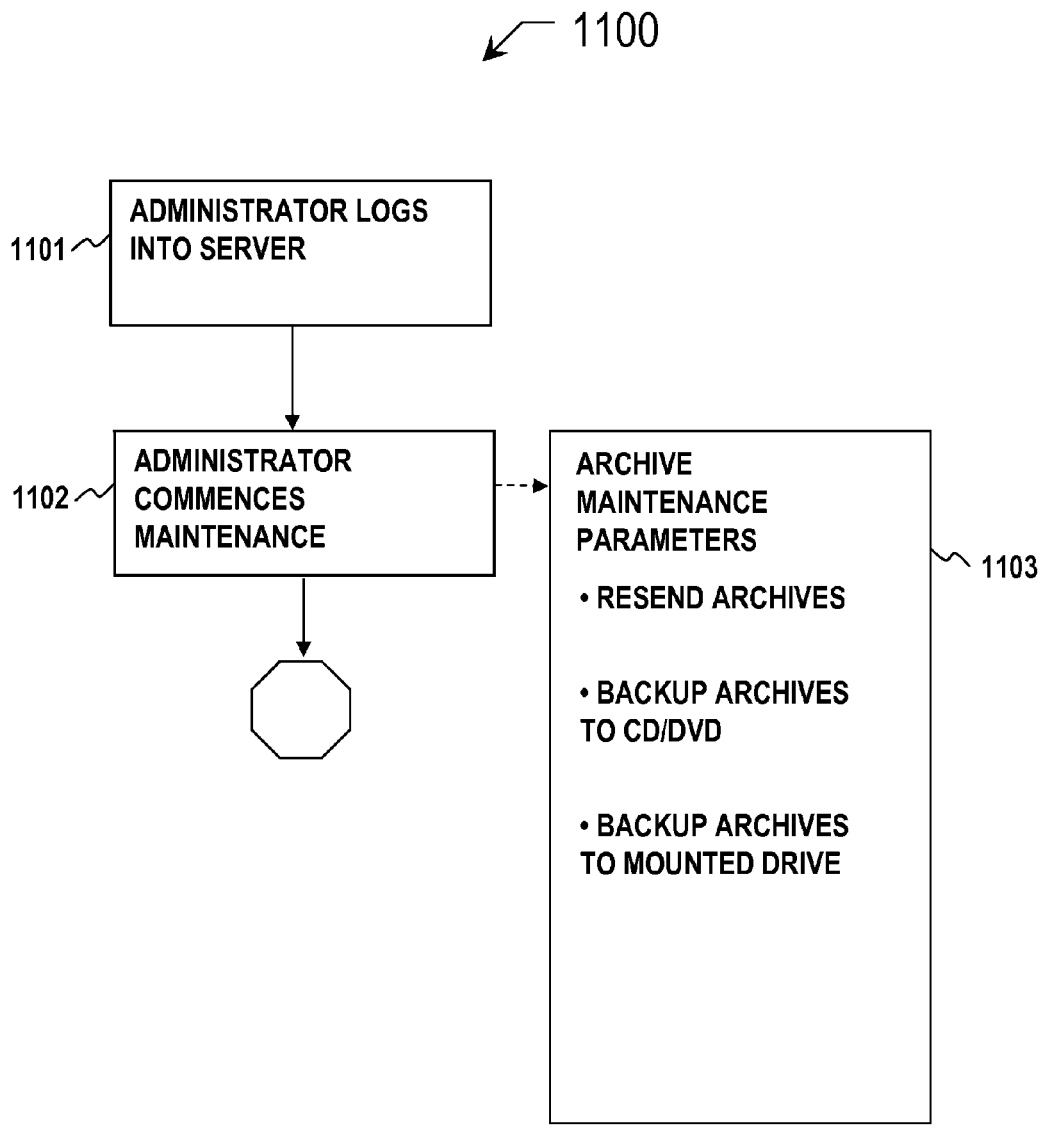
FIG. 11 is a block-diagram of a process 1100 that further elaborates on the archive management process, including the ability to write archives to CD-ROM.

FIG. 11 is a block-diagram of a process 1100 that further elaborates on the archive management process, including the ability to write archives to CD-ROM. Process 1100 includes a graphical user interface (Process 1102) designed to allow the authorized bidding administrator (Process 1101) to resend an archive to a transaction participant, to backup an archive for offsite storage, or to burn an archive to CD-ROM or related media (Process 1103)

Figure 12:
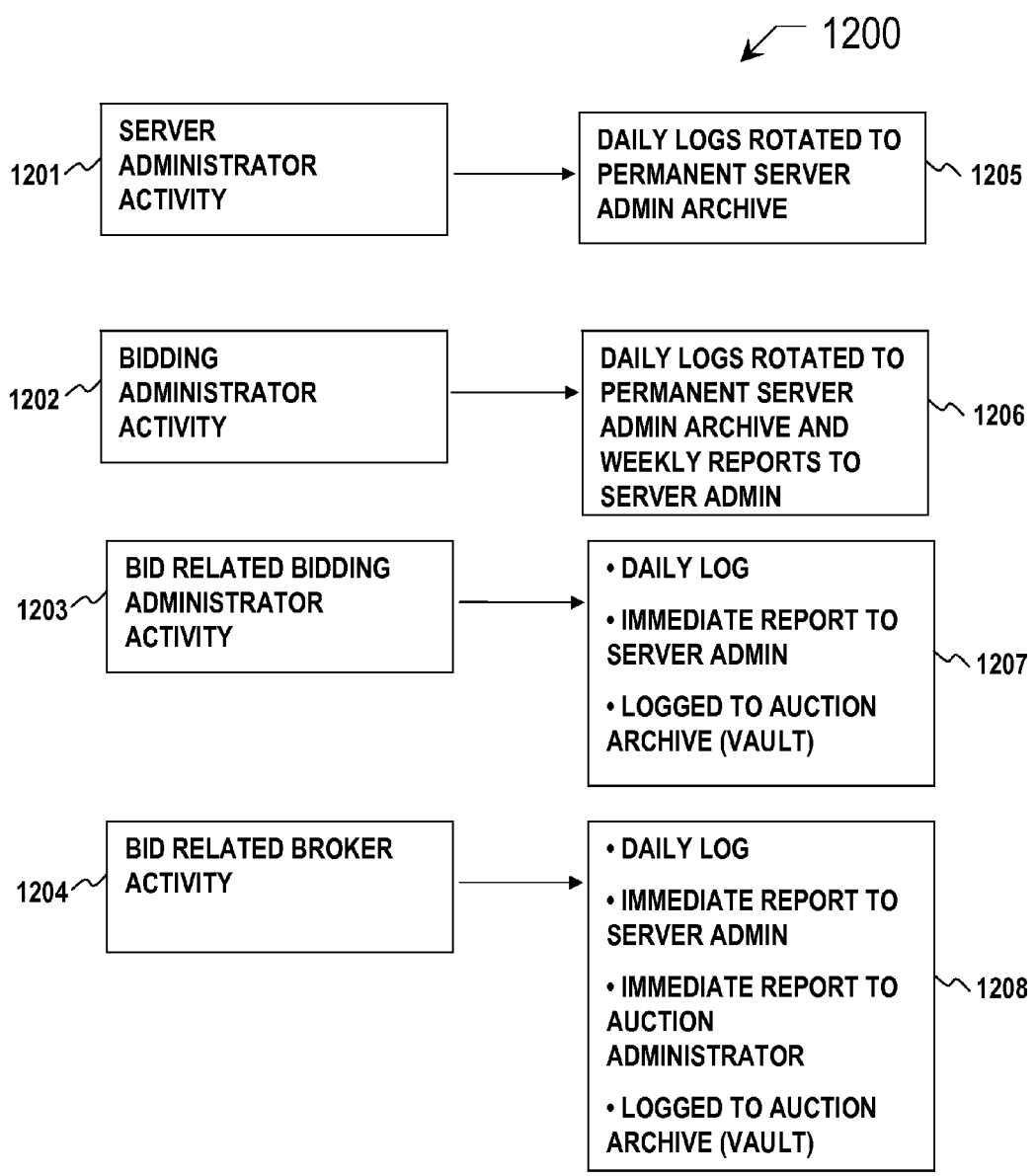
FIG. 12 is a block-diagram of a process 1200 that describes the server logging management system, which is integral to the transparency of the system.

FIG. 12 is a block-diagram of a process 1200 that describes the server logging management system, which is integral to the transparency of the system. Process 1200 includes the tracking of Server Administrator activities (Process 1201) in daily logs that are rotated to a permanent archive (Process 1205). It includes the tracking of Bidding Administrator activities, outside of the bidding process (i.e., maintenance, Process 1202) in daily logs that are both rotated to a permanent archive and copied to the Server Administrator (Process 1206). It includes the tracking of Bid-Related Bidding Administration activities (Process 1203) in daily logs that are both archived permanently and reported immediately to the Server Administrator (Process 1207.) And, it includes the tracking of Broker activities in daily logs (Process 1204) that are rotated to a permanent archive, as well as reported immediately to both the Server Administrator and the Bidding Administrator (Process 1208).

In some embodiments, the present invention provides a computer-implemented secure image bidding system process, especially for structured investment products, escrow purchases and interest rate swap transactions, whereby image-based bids are accepted via computer-based facsimile, electronic mail or other means. The bid images are immediately encrypted upon receipt and stored in a secure "Vault," preventing bid interference by the broker administering the bid process. In some embodiments, the system includes:
  a) A graphical user interface allowing brokers to setup bid processes, administer a database of bidders and perform reporting functions.
  b) A user interface to allow bid and server administrators to add authorized users to the system, cancel bidding processes and perform other system maintenance activities.
  c) Computer-based processes to restrict the date, time and length of the bid period.
  d) Computer-based processes automatically to associate specific telephone numbers and fax-modem pools with a particular bid process.
  e) Computer-based processes automatically to generate pairs of encryption keys for each particular bid process using public key infrastructure (PKI) cryptography.
  f) Computer-based processes for the automated electronic receipt of facsimile bid transmissions and their conversion to a compressed-image-format file (e.g., in some embodiments, the conventional Tagged Image File (TIF) Format).
  g) Computer-based processes for the automated electronic receipt of electronic mail bid transmissions.
  h) Computer-based processes for the automated delivery of confirmation of receipt to the sender: (a.) For electronic mail bid submittals, receipt to the sender; and (b.) For facsimile bid submittals, receipt to the sender based upon a database lookup, maintained by the broker, for an electronic mail address using the caller identification number or facsimile header information transmitted with the facsimile.
  i) Computer-based processes automatically to strip attachments from electronic mail transmissions, to convert those attachments to a Tagged Image File (TIF) Format (or other compressed-image-format file), and securely store the original electronic mail transmission so that it may not be viewed until the expiration.
  j) Computer-based processes automatically to generate and log a digital checksum for each TIF file received to ensure file integrity throughout the process.
  k) Computer-based processes automatically to encrypt each image file received using PKI and immediately to delete the unencrypted original files.
  l) Computer-based processes automatically to deliver encrypted compressed-image-format files (e.g., in some embodiments, the conventional TIF file) files to a digital "Vault," a secure directory in which specific information about a bid process—encrypted bids, server logs, auction reports, digital checksums—is retained without access by any party until the expiration of the bid process.
  m) Computer-based processes automatically to disable receipt of facsimile and electronic mail transmissions at expiration of bid period.
  n) Computer-based processes automatically to compile contents of the vault in a compressed folder following expiration of bid period.
  o) Computer-based processes automatically to send the compressed folder to a predefined distribution list via electronic mail following expiration of the bid period.
  p) Computer-based processes automatically to generate a decryption key following expiration of the bid period.
  q) Computer-based processes automatically to send the decryption key via electronic mail following expiration of the bid period.

r) Secure graphical user interface to allow the broker to enter bid summary and results information.
s) Computer-based processes automatically, upon command by the broker, to send bid summary information via electronic mail to (i) bidders and/or (ii) a predefined distribution list.
t) Computer-based processes automatically to create an electronic archive of all bid process information, including encrypted bids, server logs, broker reporting, encryption keys and checksum information.
u) Computer-based processes automatically, upon command by the broker or administrator, to write an archive or archives to CD-ROM or other media for permanent storage.

In some embodiments, the present invention provides a computer-implemented secure-image-bidding process including providing a broker user interface that elicits and receives information from one or more brokers to setup bid processes, administer a database of bidders, and perform one or more reporting functions; electronically receiving a plurality of image-based bids submitted by a plurality of bidders; encrypting the bids upon receipt or earlier; securely storing the encrypted bids in a secure electronic vault database, thus preventing bid interference by persons administering the bidding process; and decrypting and delivering to transaction participants the contents of the vault database following expiration of the bidding process.

Some embodiments further include encrypting at least some of the bids before they are submitted by respective bidders. Some embodiments further include providing a bid-administrator user interface that elicits and receives information from one or more bid-and-server administrators to add authorized users to the system, cancel bidding processes and perform other system maintenance activities.

Some embodiments further include automatically restricting a start time and a stop time of a bid period. Some embodiments further include automatically associating one or more specific telephone numbers and fax-modem pools with a particular bid process. Some embodiments further include automatically generating one or more pairs of encryption keys for each particular bid process using public key infrastructure (PKI) cryptography. Some embodiments further include automatically controlling electronic receipt of facsimile bid transmissions and converting the received facsimile bid transmissions to a Tagged Image File (TIF) format file or other suitable compressed-image-format file.

Some embodiments further include automatically controlling electronic receipt of electronic mail bid transmissions. Some embodiments further include automatically controlling delivery of a confirmation receipt to a sender, wherein, for electronic mail bid submittals, this includes delivering a confirmation receipt to a received electronic mail address of a sender, and wherein, for facsimile bid submittals, this includes delivering a confirmation receipt to the sender based upon a database lookup for an electronic mail address using at least one of (a) a caller-identification number and (b) facsimile header information transmitted with the facsimile.

Some embodiments further include for each of a plurality of received electronic-mail transmissions: automatically stripping any attachments from the transmission, automatically converting the stripped attachments to Tagged Image File (TIF) format file or other suitable compressed-image-format file, and automatically and securely storing the original electronic mail transmission in a manner so that it may not be viewed until expiration of the bid period.

Some embodiments further include automatically generating and logging a digital checksum for each TIF file or other suitable compressed-image-format file received to ensure file integrity throughout the bid period. Some embodiments further include automatically controlling encryption of each original image file received using PKI and immediately deleting the unencrypted original image files.

Some embodiments further include automatically delivering one or more encrypted TIF files or other suitable compressed-image-format files to a digital "vault," wherein the vault includes a secure directory in which specific information about a bid process including encrypted bids, server logs, auction reports, digital checksums is automatically retained without access by any person or entity until an expiration of the bid period.

Some embodiments further include automatically disabling receipt of facsimile and electronic mail transmissions at expiration of the bid period. Some embodiments further include automatically compiling contents of the vault in a compressed folder following expiration of bid period. Some embodiments further include automatically sending the compressed folder to a predefined distribution list via electronic mail following expiration of the bid period. Some embodiments further include automatically generating a decryption key following expiration of the bid period. Some embodiments further include automatically sending the decryption key via electronic mail following expiration of the bid period.

Some embodiments further include automatically securing a graphical user interface that allows the broker to enter bid summary and results information.

Some embodiments further include automatically, upon command by the broker, sending bid summary information via electronic mail to at least one of (i) bidders and (ii) a predefined distribution list of email addresses and (iii) a predefined list of facsimile numbers. Some embodiments further include automatically creating an electronic archive of all bid process information, including encrypted bids, server logs, broker reporting, encryption keys and checksum information. Some embodiments further include automatically, upon command by the broker or administrator, writing an archive or archives to CD-ROM or other media for permanent storage.

In some embodiments, the present invention provides a computer-implemented secure-image-bidding system including a) a graphical user interface operable to allow brokers to setup bid processes, administer a database of bidders and perform reporting functions; b) a user interface operable to allow bid-and-server administrators to add authorized users to the system, cancel bidding processes and perform other system maintenance activities; c) a computer-based process operable to restrict the date, time and length of a bid period; d) a computer-based process operable to automatically associate specific telephone numbers and fax-modem pools with a particular bid process; e) a computer-based process operable to automatically generate pairs of encryption keys for each particular bid process using public key infrastructure (PKI) cryptography; f) a computer-based process operable to automatically control electronic receipt of facsimile bid transmissions and their conversion to a Tagged Image File (TIF) format file or other suitable compressed-image-format file; g) a computer-based process operable to automatically control electronic receipt of electronic mail bid transmissions; h) a computer-based process operable to automatically control delivery of a confirmation receipt to a sender; wherein, for electronic mail bid submittals, this provides delivery of a confirmation receipt to a received electronic mail address of a sender, wherein, for facsimile bid submittals, this provides delivery of a confirmation receipt to the sender based upon a database lookup, maintained by the broker, for an electronic mail address using a caller identification number or facsimile header information transmitted with the facsimile; i) a computer-based process operable to automatically strip attachments from electronic-mail transmissions, convert those attachments to a Tagged Image File (TIF) format file or other suitable compressed-image-format file, and securely store the original electronic mail transmission so that it may not be viewed until expiration of the bid period; j) a computer-based process operable to automatically generate and log a digital checksum for each TIF file or other suitable compressed-image-format file received to ensure file integrity throughout the bid period; k) a computer-based process operable to automatically control encrypt each image file received using PKI and immediately to delete the unencrypted original files; l) a computer-based process operable to automatically deliver one or more encrypted TIF files or other suitable compressed-image-format files to a digital "Vault," a secure directory in which specific information about a bid process—encrypted bids, server logs, auction reports, digital checksums—is retained without access by any party until the expiration of the bid period; m) a computer-based process operable to automatically disable receipt of facsimile and electronic mail transmissions at expiration of the bid period; n) a computer-based process operable to automatically compile contents of the Vault in a compressed folder following expiration of bid period; o) a computer-based process operable to automatically send the compressed folder to a predefined distribution list via electronic mail following expiration of the bid period; p) a computer-based process operable to automatically generate a decryption key following expiration of the bid period; q) a computer-based process operable to automatically send the decryption key via electronic mail following expiration of the bid period; r) a secure graphical user interface that allows the broker to enter bid summary and results information; s) a computer-based process operable to automatically, upon command by the broker, to send bid summary information via electronic mail to (i) bidders and/or (ii) a predefined distribution list; t) a computer-based process operable to automatically create an electronic archive of all bid process information, including encrypted bids, server logs, broker reporting, encryption keys and checksum information; and u) a computer-based process operable to automatically, upon command by the broker or administrator, write an archive or archives to CD-ROM or other media for permanent storage.

In some embodiments, the present invention provides a computer-implemented secure-image-bidding process including providing a broker user interface that elicits and receives information from one or more brokers to setup a plurality of bid processes, administers a database of bidders, and performs one or more reporting functions; electronically receiving a plurality of image-based bids submitted by a plurality of bidders; encrypting the plurality of image-based bids upon receipt or earlier to form a plurality of encrypted bids; securely storing the plurality of encrypted bids in a secure electronic vault database; and decrypting and delivering to transaction participants information from the vault database following expiration of the bidding process.

In some embodiments, the encrypting of the plurality of bids upon receipt or earlier further includes encrypting at least some of the plurality of bids before they are submitted by respective bidders.

Some embodiments further include providing a bid-administrator user interface that elicits and receives information from one or more bid-and-server administrators to add authorized users to the system and cancel bidding processes; automatically restricting a start time and a stop time of a bid period; automatically generating one or more pairs of encryption keys for each one of the plurality of bid processes using public key infrastructure (PKI) cryptography; automatically controlling electronic receipt of facsimile bid transmissions and converting the received facsimile bid transmissions to a compressed-image-format file; and automatically controlling electronic receipt of electronic mail bid transmissions.

Some embodiments further include automatically controlling delivery of a confirmation receipt to a sender, wherein, for electronic mail bid submittals, the automatically controlling of the delivery includes delivering a confirmation receipt to a received electronic mail address of a sender, and wherein, for facsimile bid submittals, the automatically controlling of the delivering includes delivering a confirmation receipt to the sender based upon a database lookup for an electronic mail address using at least one of a group consisting of (a) a caller-identification number and (b) facsimile header information transmitted with the facsimile.

Some embodiments further include, for each of a plurality of received electronic-mail transmissions, automatically stripping any attachments from the transmission; automatically converting the stripped attachments to a compressed-image-format file; automatically and securely storing the original electronic mail transmission such that the original electronic mail transmission cannot be viewed until expiration of the bid period; automatically generating and logging a digital checksum for each compressed-image format file received to ensure file integrity throughout the bid period; automatically controlling encryption of each original image file received using PKI and immediately deleting unencrypted original image files; and automatically receiving encrypted compressed-image-format files into a digital vault, wherein the vault includes a secure directory in which specific information about one of the plurality of bid processes including encrypted bids, server logs, auction reports, and digital checksums is automatically retained in an inaccessible state until an expiration of the bid period.

Some embodiments further include automatically compiling contents of the vault in a compressed folder following expiration of bid period; automatically sending the compressed folder to a predefined distribution list via electronic mail following expiration of the bid period; automatically generating a decryption key following expiration of the bid period; and automatically sending the decryption key via electronic mail following expiration of the bid period.

Some embodiments further include automatically disabling receipt of facsimile and electronic mail transmissions upon expiration of the bid period.

Some embodiments further include automatically securing a graphical user interface that allows the broker to enter bid summary and results information; and automatically, upon command by the broker, sending bid summary information via electronic mail to at least one of a group consisting of (i) bidders and (ii) a predefined distribution list of email addresses and (iii) a predefined list of facsimile numbers.

Some embodiments further include automatically creating an electronic archive of information relating to the plurality of bid processes, including encrypted bids, server logs, broker reporting, encryption keys, and checksum information; and automatically, upon command by at least one of (i) the broker and (ii) the administrator, writing one or more archives to computer-readable archive media for long-term storage.

In some embodiments, the present invention provides a computer-readable medium having instructions stored thereon for causing a suitably programmed computer to execute a method, the method including providing a broker user interface that elicits and receives information from one or more brokers to setup a plurality of bid processes, administers a database of bidders, and performs one or more reporting functions; electronically receiving a plurality of image-based bids submitted by a plurality of bidders; encrypting the plurality of image-based bids upon receipt or earlier to form a plurality of encrypted bids; securely storing the plurality of encrypted bids in a secure electronic vault database; and decrypting and delivering to transaction participants information from the vault database following expiration of the bidding process.

Some embodiments further include instructions such that the encrypting of the plurality of bids upon receipt or earlier further includes encrypting at least some of the plurality of bids before they are submitted by respective bidders.

Some embodiments further include instructions such that the method further includes providing a bid-administrator user interface that elicits and receives information from one or more bid-and-server administrators to add authorized users to the system and cancel bidding processes; automatically restricting a start time and a stop time of a bid period; automatically generating one or more pairs of encryption keys for each one of the plurality of bid processes using public key infrastructure (PKI) cryptography; automatically controlling electronic receipt of facsimile bid transmissions and converting the received facsimile bid transmissions to a compressed-image-format file; and automatically controlling electronic receipt of electronic mail bid transmissions.

Some embodiments further include instructions such that the method further includes automatically controlling delivery of a confirmation receipt to a sender, wherein, for electronic mail bid submittals, the automatically controlling of the delivery includes delivering a confirmation receipt to a received electronic mail address of a sender, and wherein, for facsimile bid submittals, the automatically controlling of the delivering includes delivering a confirmation receipt to the sender based upon a database lookup for an electronic mail address using at least one of a group consisting of (a) a caller-identification number and (b) facsimile header information transmitted with the facsimile.

Some embodiments further include instructions such that the method further includes, for each of a plurality of received electronic-mail transmissions, automatically stripping any attachments from the transmission; automatically converting the stripped attachments to a compressed-image-format file; automatically and securely storing the original electronic mail transmission such that the original electronic mail transmission cannot be viewed until expiration of the bid period; automatically generating and logging a digital checksum for each compressed-image format file received to ensure file integrity throughout the bid period; automatically controlling encryption of each original image file received using PKI and immediately deleting unencrypted original image files; and automatically receiving encrypted compressed-image-format files into a digital vault, wherein the vault includes a secure directory in which specific information about one of the plurality of bid processes including encrypted bids, server logs, auction reports, and digital checksums is automatically retained in an inaccessible state until an expiration of the bid period.

Some embodiments further include instructions such that the method further includes automatically compiling contents of the vault in a compressed folder following expiration of bid period; automatically sending the compressed folder to a predefined distribution list via electronic mail following expiration of the bid period; automatically generating a decryption key following expiration of the bid period; and automatically sending the decryption key via electronic mail following expiration of the bid period.

Some embodiments further include instructions such that the method further comprises automatically disabling receipt of facsimile and electronic mail transmissions upon expiration of the bid period.

Some embodiments further include instructions such that the method further includes automatically securing a graphical user interface that allows the broker to enter bid summary and results information; and automatically, upon command by the broker, sending bid summary information via electronic mail to at least one of a group consisting of (i) bidders and (ii) a predefined distribution list of email addresses and (iii) a predefined list of facsimile numbers.

Some embodiments further include instructions such that the method further includes automatically creating an electronic archive of information relating to the plurality of bid processes, including encrypted bids, server logs, broker reporting, encryption keys, and checksum information; and automatically, upon command by at least one of (i) the broker and (ii) the administrator, writing one or more archives to computer-readable archive media for long-term storage.

In some embodiments, the present invention provides a computer-implemented secure-image-bidding system including a broker-user interface that elicits and receives information from one or more brokers to setup a plurality of bid processes, administers a database of bidders, and performs one or more reporting functions; a receiver configured to electronically receive a plurality of image-based bids submitted by a plurality of bidders; an encrypter configured to encrypt the plurality of bids upon receipt or earlier to form a plurality of encrypted bids; storage configured to securely store the plurality of encrypted bids in a secure electronic vault database; and a decryptor configured to decrypt and deliver to transaction participants information from the vault database following expiration of the bidding process.

In some embodiments, the encrypter encrypts at least some of the plurality of bids before they are submitted by respective bidders.

Some embodiments further include a bid-administrator user interface that elicits and receives information from one or more bid-and-server administrators to add authorized users to the system and cancel bidding processes; a timer configured to automatically restrict a start time and a stop time of a bid period; an encryption-key generator configured to automatically generate one or more pairs of encryption keys for each one of the plurality of bid processes using public key infrastructure (PKI) cryptography; a facsimile receiver and image converter configured to automatically control electronic receipt of facsimile bid transmissions and convert the received facsimile bid transmissions to a compressed-image-format file; and an electronic-mail receiver configured to automatically control electronic receipt of electronic mail bid transmissions.

Some embodiments further include a confirmation unit configured to automatically control delivery of a confirmation receipt to a sender, wherein, for electronic mail bid submittals, the confirmation unit automatically delivers a confirmation receipt to a received electronic mail address of a sender, and wherein, for facsimile bid submittals, the confirmation unit automatically delivers a confirmation receipt to the sender based upon a database lookup for an electronic mail address using at least one of a group consisting of (a) a caller-identification number and (b) facsimile header information transmitted with the facsimile.

Some embodiments further include, for each of a plurality of received electronic-mail transmissions, a stripper unit configured to automatically strip any attachments from the transmission; an image-conversion unit configured to automatically convert the stripped attachments to a compressed-image-format file; a storage unit configured to automatically and securely store the original electronic mail transmission such that the original electronic mail transmission cannot be viewed until expiration of the bid period; a log unit configured to automatically generate and log a digital checksum for each compressed-image format file received to ensure file integrity throughout the bid period; an encryption unit configured to automatically control encryption of each original image file received using PKI and immediately delete unencrypted original image files; and a digital vault configured to automatically receive encrypted compressed-image-format files, wherein the vault includes a secure directory in which specific information about one of the plurality of bid processes including encrypted bids, server logs, auction reports, and digital checksums is automatically retained in an inaccessible state until an expiration of the bid period.

Some embodiments further include a compiler configured to automatically compile contents of the vault in a compressed folder following expiration of bid period; a transmitting unit configured to automatically send the compressed folder to a predefined distribution list via electronic mail following expiration of the bid period; and a decryption unit configured to automatically generate a decryption key following expiration of the bid period, wherein the transmitting unit is also configured to automatically send the decryption key via electronic mail following expiration of the bid period.

Some embodiments further include a disable timer configured to automatically disable receipt of facsimile and electronic mail transmissions upon expiration of the bid period.

Some embodiments further include a secure graphical user interface that allows the broker to enter bid summary and results information; and a transmitter configured to automatically, upon command by the broker, send bid summary information via electronic mail to at least one of a group consisting of (i) bidders and (ii) a predefined distribution list of email addresses and (iii) a predefined list of facsimile numbers.

Some embodiments further include an archive unit configured to automatically create an electronic archive of information relating to the plurality of bid processes, including encrypted bids, server logs, broker reporting, encryption keys, and checksum information; and an archive-storage unit configured to automatically, upon command by at least one of a group consisting of (i) the broker and (ii) the administrator, write one or more archives to computer-readable archive media for long-term storage.

In some embodiments, the present invention provides a system including a) a graphical user interface operable to allow brokers to setup a plurality of bid processes, administer a database of bidders and perform reporting functions; b) a user interface operable to allow bid-and-server administrators to add authorized users to the system and to cancel bidding processes; c) a computer-based unit operable to restrict the date, time and length of a bid period; d) a computer-based unit operable to automatically associate specific telephone numbers and fax-modem pools with one of the plurality of bid processes; e) a computer-based unit operable to automatically generate pairs of encryption keys for each one of the plurality of bid processes using public key infrastructure (PKI) cryptography; f) a computer-based unit operable to automatically control electronic receipt of facsimile bid transmissions and their conversion to a compressed-image-format file; g) a computer-based unit operable to automatically control electronic receipt of electronic mail bid transmissions; h) a computer-based unit operable to automatically control delivery of a confirmation receipt to a sender; wherein, for electronic mail bid submittals, this provides delivery of a confirmation receipt to a received electronic mail address of a sender, and wherein, for facsimile bid submittals, this provides delivery of a confirmation receipt to the sender based upon a database lookup, maintained by the broker, for an electronic mail address using a caller identification number or facsimile header information transmitted with the facsimile; i) a computer-based unit operable to automatically strip attachments from electronic-mail transmissions, convert those attachments to a compressed-image-format file, and securely store the original electronic mail transmission so that it may not be viewed until expiration of the bid period; j) a computer-based unit operable to automatically generate and log a digital checksum for each compressed-image-format file received to ensure file integrity throughout the bid period; k) a computer-based unit operable to automatically control encrypt each image file received using PKI and immediately to delete the unencrypted original files; l) a computer-based unit operable to automatically deliver encrypted compressed-image format files to a digital Vault, a secure directory in which specific information about one of the plurality of bid processes, including encrypted bids, server logs, auction reports, and digital checksums, is retained without access by any party until the expiration of the bid period; m) a computer-based unit operable to automatically disable receipt of facsimile and electronic mail transmissions at expiration of the bid period; n) a computer-based unit operable to automatically compile contents of the Vault in a compressed folder following expiration of bid period; o) a computer-based unit operable to automatically send the compressed folder to a predefined distribution list via electronic mail following expiration of the bid period; p) a computer-based unit operable to automatically generate a decryption key following expiration of the bid period; q) a computer-based unit operable to automatically send the decryption key via electronic mail following expiration of the bid period; r) a secure graphical user interface that allows the broker to enter bid summary and results information; s) a computer-based unit operable to automatically, upon command by the broker, to send bid summary information via electronic mail to (i) bidders and/or (ii) a predefined distribution list; t) a computer-based unit operable to automatically create an electronic archive of information relating to one of the plurality of bid processes, the archived information including encrypted bids, server logs, broker reporting, encryption keys and checksum information; and u) a computer-based unit operable to automatically, upon command by the broker or administrator, write an archive to archive media for long-term storage.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A computer-implemented secure-bidding process comprising:

providing a broker user interface on a computer system that elicits and receives information from one or more brokers to setup a plurality of bid processes including a first bid process, administers a database of bidders on the computer system, and performs one or more reporting functions;

defining, in the computer system, an expiration time for a bid period of the first bid process;

electronically receiving into the computer system a plurality of bids submitted by a plurality of bidders for the first bid process only at times before the expiration time for the first bid process;

encrypting, in the computer system, the plurality of bids for the first bid process upon receipt or earlier to form a plurality of encrypted bids;

automatically generating and logging at least one digital checksum, in the computer system, for each of the plurality of bids received for the first bid process;

securely storing on the computer system the plurality of encrypted bids in a secure electronic vault, wherein the vault includes a directory in which specific information, including encrypted bids and digital checksums, about each one of the plurality of bid processes is automatically retained, and wherein the specific information for the first bid process is retained in an inaccessible state until the expiration time of the first bid process;

decrypting using the computer system and delivering to one or more transaction participants bid information for the first bid process from the vault only following the expiration time of the first bid process;

receiving into the computer system a bid summary report based on the decrypted bid information and a decision from the one or more brokers to award the first bid;

delivering the bid summary report to the plurality of bidders for the first bid process; and using the computer system, automatically creating an electronic archive of information relating to the plurality of bid processes, including the encrypted bids and the bid summary report, for the first bid process, wherein the electronic archive of information includes the digital checksum information.

2. The process of claim 1, wherein the encrypting of the plurality of bids upon receipt or earlier further includes encrypting at least some of the plurality of bids after they are generated by a bidder and before they are sent to the bid receiving computer system.

3. The process of claim 1, further comprising:

providing a bid-administrator user interface that elicits and receives information from one or more bid-and-server administrators to add authorized users to the system and cancel bidding processes;

automatically restricting a start time and a stop time of a bid period;

automatically generating one or more pairs of encryption keys for each one of the plurality of bid processes using public key infrastructure (PKI) cryptography; and automatically controlling electronic receipt of bid transmissions.

4. The process of claim 1, further comprising, for each of a plurality of received electronic-mail transmissions for the first bid process:

automatically stripping any attachments from the transmission;

automatically converting the stripped attachments to a compressed file;

automatically and securely storing the original electronic mail transmission such that the original electronic mail transmission cannot be viewed until the expiration time of the bid period for the first bid process;

automatically generating and logging a digital checksum for each compressed file received to ensure file integrity throughout the bid period;

automatically controlling encryption of each original file received using PKI and immediately deleting unencrypted original files; and wherein the securely storing includes automatically receiving the encrypted compressed files into the vault.

5. The process of claim 1, further comprising:

automatically compiling contents of the vault in a compressed folder following expiration of the bid period for the first bid process;

automatically sending the compressed folder to a predefined distribution list via electronic mail following expiration of the bid period;

automatically generating a decryption key following expiration of the bid period; and automatically sending the decryption key via electronic mail following expiration of the bid period.

6. The process of claim 1, further comprising automatically disabling receipt of bid transmissions for the first bid process upon expiration of the bid period for the first bid process.

7. The process of claim 1, wherein the electronic archive of information relating to the plurality of bid processes further includes server logs, broker reporting, and encryption keys, the process further comprising: automatically, upon command by at least one of (i) the broker and (ii) the administrator, writing one or more archives to computer-readable archive media for long-term storage.

8. A non-transitory computer-readable medium having instructions stored thereon for causing a suitably programmed computer to execute a method, the method comprising:

providing a broker user interface that elicits and receives information from one or more brokers to setup a plurality of bid processes including a first bidding process, administers a database of bidders, and performs one or more reporting functions;

defining, in the computer system, an expiration time for a bid period of the first bidding process;

electronically receiving a plurality of bids submitted by a plurality of bidders for the first bidding process only at times before the expiration time of the first bidding process;

encrypting the plurality of bids for the first bid process upon receipt or earlier to form a plurality of encrypted bids;

automatically generating and logging at least one digital checksum, in the computer system, for each of the plurality of bids received for the first bid process;

securely storing the plurality of encrypted bids in a secure electronic vault, wherein the vault includes a directory in which specific information, including encrypted bids and digital checksums, about each one of the plurality of bid processes is automatically retained, and wherein the specific information for the first bid process is retained in an inaccessible state until the expiration time of the first bidding process;

decrypting and delivering to one or more transaction participants bid information for the first bidding process from the vault only following the expiration time of the first bid process;

receiving into the computer system a bid summary report based on the decrypted bid information and a decision from the one or more brokers to award the first bid;

delivering the bid summary report to the plurality of bidders for the first bid process; and using the computer system, automatically creating an electronic archive of information relating to the plurality of bid processes, including the encrypted bids, the bid summary report, and the digital checksum information for the first bid process, wherein the electronic archive of information includes the digital checksum information.

9. The computer-readable medium of claim 8, further comprising instructions such that the encrypting of the plurality of bids upon receipt or earlier further includes encrypting at least some of the plurality of bids before they are submitted by respective bidders.

10. The computer-readable medium of claim 8, further comprising instructions such that the method further comprises:
automatically generating one or more pairs of encryption keys for each one of the plurality of bid processes using public key infrastructure (PKI) cryptography.

11. The computer-readable medium of claim 8, further comprising instructions such that the method further comprises:
providing a bid-administrator user interface that elicits and receives information from one or more bid-and-server administrators to add authorized users to the system and cancel bidding processes;
automatically restricting a start time and a stop time of a bid period;
automatically generating one or more pairs of encryption keys for each one of the plurality of bid processes using public key infrastructure (PKI) cryptography; and
automatically controlling electronic receipt of bid transmissions.

12. The computer-readable medium of claim 8, further comprising instructions such that the method further comprises automatically controlling delivery of a confirmation receipt to a sender, wherein, for electronic mail bid submittals, the automatically controlling of the delivery includes delivering a confirmation receipt to a received electronic mail address of a sender, and wherein, for facsimile bid submittals, the automatically controlling of the delivering includes delivering a confirmation receipt to the sender based upon a database lookup for an electronic mail address using at least one of a group consisting of: (a) a caller-identification number, and (b) facsimile header information transmitted with the facsimile.

13. The computer-readable medium of claim 8, further comprising instructions such that the method further comprises, for each of a plurality of received electronic-mail transmissions for the first bid process:
automatically stripping any attachments from the transmission;
automatically converting the stripped attachments to a compressed file;
automatically and securely storing the original electronic mail transmission such that the original electronic mail transmission cannot be viewed until the expiration time of the bid period for the first bid process;
automatically generating and logging a digital checksum for each compressed file received to ensure file integrity throughout the bid period;
automatically controlling encryption of each original file received using PKI and immediately deleting unencrypted original files; and
wherein the securely storing includes automatically receiving the encrypted compressed files into the vault.

14. The computer-readable medium of claim 13, further comprising instructions such that the method further comprises:
automatically compiling contents of the vault in a compressed folder following expiration of the bid period for the first bid process;
automatically sending the compressed folder to a predefined distribution list via electronic mail following expiration of the bid period;
automatically generating a decryption key following expiration of the bid period; and
automatically sending the decryption key via electronic mail following expiration of the bid period.

15. The computer-readable medium of claim 8, further comprising instructions such that the method further comprises automatically disabling receipt of bid transmissions for the first bid process upon expiration of the bid period for the first bid process.

16. The computer-readable medium of claim 8, further comprising instructions such that the electronic archive of information relating to the plurality of bid processes further includes server logs, broker reporting, and encryption keys, and further comprising instructions such that the method further comprises: automatically, upon command by at least one of (i) the broker and (ii) the administrator, writing one or more archives to computer-readable archive media for long-term storage.

17. A computer-implemented secure-bidding system comprising:
a computer system that includes: a broker-user interface that elicits and receives information into the computer system from one or more brokers to setup a plurality of bid processes including a first bidding process, administers a database of bidders, and performs one or more reporting functions, wherein the first bidding process has a defined expiration time;
a receiver configured to electronically receive into the computer system a plurality of bids submitted by a plurality of bidders for the first bidding process only at times before the expiration time of the first bidding process;
an encrypter in the computer system configured to encrypt the plurality of bids for the first bid process upon receipt or earlier to form a plurality of encrypted bids;
an automatic digital checksum generator and logger that generates and logs at least one digital checksum, in the computer system, for each of the plurality of bids received for the first bid process;
storage configured to securely store the plurality of encrypted bids in a secure electronic vault, wherein the vault includes a directory in which specific information, including encrypted bids and digital checksums, about each one of the plurality of bid processes is automatically retained, and wherein the specific information for the first bid process is retained in an inaccessible state until the expiration time of the first bid process;
a decryptor configured to decrypt and deliver to one or more transaction participants bid information for the first bidding process from the vault only following the expiration time of the first bid process;

a receiver configured to electronically receive into the computer system a bid summary report based on the decrypted bid information and a decision from the one or more brokers to award the first bid;

a transmitter configured to deliver the bid summary report to the plurality of bidders for the first bid process; and an archive unit configured to automatically create an electronic archive of information relating to the plurality of bid processes, including the encrypted bids, the bid summary report, and the digital checksum information for the first bid process, wherein the archive unit is configured to archive information that includes the digital checksum information.

18. The system of claim 17, wherein the encrypter encrypts at least some of the plurality of bids before they are submitted by respective bidders.

19. The system of claim 17, further comprising, for each of a plurality of received electronic-mail transmissions for the first bid process:

a stripper unit configured to automatically strip any attachments from the transmission;

an attachment-conversion unit configured to automatically convert the stripped attachments to a compressed file;

a storage unit configured to automatically and securely store the original electronic mail transmission such that the original electronic mail transmission cannot be viewed until the expiration time of the bid period for the first bid process;

a log unit configured to automatically generate and log a digital checksum for each compressed file received to ensure file integrity throughout the bid period;

an encryption unit configured to automatically control encryption of each original file received using PKI and immediately delete unencrypted original files, wherein the vault is configured to automatically receive encrypted compressed files;

a compiler configured to automatically compile contents of the vault in a compressed folder following expiration of the bid period for the first bid process;

a transmitting unit configured to automatically send the compressed folder to a predefined distribution list via electronic mail following expiration of the bid period; and a decryption unit configured to automatically generate a decryption key following expiration of the bid period, wherein the transmitting unit is also configured to automatically send the decryption key via electronic mail following expiration of the bid period.

20. The system of claim 17, further comprising a disable timer configured to automatically disable receipt of facsimile and electronic mail transmissions for the first bid process upon expiration of the bid period for the first bid process.

21. The system of claim 17, further comprising:

a secure graphical user interface that allows the broker to enter bid summary and results information; and a transmitter configured to automatically, upon command by the broker, send bid summary information via electronic mail to at least one of a group consisting of (i) bidders and (ii) a predefined distribution list of email addresses and (iii) a predefined list of facsimile numbers.

22. The system of claim 17, wherein the electronic archive of information relating to the plurality of bid processes further includes server logs, broker reporting, and encryption keys, and the system further comprising:

an archive-storage unit configured to automatically, upon command by at least one of a group consisting of (i) the broker and (ii) the administrator, write one or more archives to computer-readable archive media for long-term storage.

23. A system comprising:

a) a graphical user interface configured to allow brokers to setup a plurality of bid processes including a first bidding process, administer a database of bidders and perform reporting functions, wherein the first bidding process has a defined expiration time;

b) a user interface configured to allow bid-and-server administrators to add authorized users to the system and to cancel bidding processes;

c) a computer-based unit configured to restrict the date, time and length of a bid period for the first bidding process;

d) a computer-based unit configured to automatically associate specific telephone numbers and fax-modem pools with one of the plurality of bid processes;

e) a computer-based unit configured to automatically generate pairs of encryption keys for each one of the plurality of bid processes using public key infrastructure (PKI) cryptography;

f) a computer-based unit configured to automatically control electronic receipt of facsimile bid transmissions and their conversion to a compressed file;

g) a computer-based unit configured to automatically control electronic receipt of electronic mail bid transmissions;

h) a computer-based unit configured to automatically control delivery of a confirmation receipt to a sender; 1) wherein, for electronic mail bid submittals, this provides delivery of a confirmation email receipt to a received electronic mail address of the sender, and 2) wherein, for facsimile bid submittals, this provides delivery of a confirmation facsimile receipt to the sender using a caller identification number or facsimile header information transmitted with the facsimile bid;

i) a computer-based unit configured to automatically strip attachments from electronic-mail transmissions, convert those attachments to a compressed file, and securely store the original electronic mail transmission so that it may not be viewed until expiration of the bid period;

j) a computer-based unit configured to automatically generate and log a digital checksum for each compressed file received to ensure file integrity throughout the bid period;

k) a computer-based unit configured to automatically control encrypt encryption of each file received using PKI and to automatically delete the unencrypted original files;

l) a computer-based unit configured to automatically deliver encrypted compressed files to a digital vault, a secure directory in which specific information about one of the plurality of bid processes is retained without access by any party until the expiration of the bid period;

m) a computer-based unit configured to automatically disable receipt of facsimile and electronic mail transmissions for the first bidding process at the expiration of the bid period for the first bidding process;

n) a computer-based unit configured to automatically compile contents of the vault in a compressed folder following expiration of the bid period for the first bidding process;

o) a computer-based unit configured to automatically send the compressed folder to a predefined distribution list via electronic mail following expiration of the bid period for the first bidding process;

p) a computer-based unit configured to automatically generate a decryption key following expiration of the bid period;
q) a computer-based unit configured to automatically send the decryption key via electronic mail following expiration of the bid period;
r) a secure graphical user interface configured to allow the broker to enter bid summary and results information;
s) a computer-based unit configured to automatically, upon command by the broker, to send bid summary information via electronic mail to a predefined distribution list;
t) a computer-based unit configured to automatically create an electronic archive of information relating to one of the plurality of bid processes, the archived information including encrypted bids, server logs, broker reporting, encryption keys and checksum information; and
u) a computer-based unit configured to automatically, upon command by the broker or administrator, write an archive to archive media for long-term storage.

* * * * *